March 24, 1970 C. J. DE COTIIS 3,501,967
PHOTODYNAMIC PICKOFF MEANS HAVING A PULSE
DURATION MODULATED OUTPUT
Filed Dec. 4, 1967 2 Sheets-Sheet 1

INVENTOR.
CONSTANT J. DECOTIIS
BY Karl A. O'Brien
ATTORNEYS

United States Patent Office 3,501,967
Patented Mar. 24, 1970

3,501,967
PHOTODYNAMIC PICKOFF MEANS HAVING A
PULSE DURATION MODULATED OUTPUT
Constant J. De Cotiis, Cranford, N.J., assignor to Singer-General Precision, Inc., a corporation of Delaware
Filed Dec. 4, 1967, Ser. No. 687,552
Int. Cl. G01c 19/28
U.S. Cl. 74—5.6                                    12 Claims

ABSTRACT OF THE DISCLOSURE

The pickoff system includes a light source which is mounted on the stator member and is arranged to illuminate the interior of the hollow hub portion of the rotor member. The hollow hub portion of the rotor is provided with an aperture which is spaced a distance from the rotor spin axis, so that the spinning rotor transmits a beam of light through the aperture and the light beam traces a circular path at each point along its length. A photodetector having four, independently operable, coplanar portions which are defined by a pair of mutually perpendicular dividing lines is mounted on the interior of the housing with the plane of the photodector perpendicular to the stator reference axis. The photodetector is so oriented that the two dividing lines lie in the two planes representing the two degrees of freedom of the rotor member, so that the rotating light beam traces a circular path on the photodetector when the rotor spin axis coincides with the stator reference axis. At this time, since the center of the circular path coincides with the point of intersection of the dividing lines of the photodetector, each of the four portions of the photodetector will produce a series of output pulses having a pulse repetition rate corresponding to the rotor spin speed and the time durations or "widths" of all of the pulses in the four series will be equal. When the rotor spin axis deviates from the stator reference axis, the center of the path traced by the light beam on the photodetector will be shifted from the point of intersection of the dividing lines and the pulse widths of the four series of pulses will become unequal, so that the relative magnitudes of the four pulse widths will completely define the position of the rotor spin axis with respect to the stator reference axis.

BACKGROUND OF THE INVENTION

Field of the invention

This invention relates generally to spatial orientation responsive devices and the like and more particularly to photodynamic pickoff means therefore having the capability of supplying two-axis positional information in the form of output signals of the pulse duration modulated type.

Description of the prior art

Spatial orientation responsive devices, such as directional gyroscopes, rate gyroscopes, angular accelerometers, and the like, are often employed in aircraft and guided missile applications to provide output signals which represent some aspect of the attitude or motion of the vehicle in which the devices are mounted. A common form of spatial orientation responsive device utilizes a stator member which is fixed in position with respect to the vehicle in which the device is mounted and a spinning rotor member which has one or more degrees of freedom of movement. The spinning rotor member acts as a reference against which positional and motional deviations of the stator and vehicle may be measured. The angular deviation between the rotor spin axis and a stator reference axis in one or more planes representing the degrees of freedom of the device may then be utilized to provide directional, rate or acceleration signals depending upon the application and type of equipment involved. In order to obtain these signals, however, it is necessary to employ a pickoff system which functions to convert the positional difference between the rotor and stator members of the device into an output signal which represents the desired quantity being measured.

Many of the prior art pickoff systems function to provide an output signal of the analog type wherein the informational content of the signal is manifested as a continuous function of some parameter of the signal, such as amplitude, for example. At the present time, however, computers and control systems which operate on digital principles are becoming increasingly popular because of their high degree of accuracy and flexibility of use as compared to the older systems which operate on analog principles. The high degree of accuracy afforded by digital computers and control systems makes them ideally suited for use in guided missile and aircraft applications, with the result that prior art pickoff systems which provide an analog type of output signal cannot be used without a conversion system of some sort to convert the analog signal into a digital signal. The use of such conversion systems, however, introduces undesirable errors and noise in the output signal and adds to the complexity of the overall system in which the device is employed. Accordingly, it is desirable that a pickoff system employed on a spatial orientation responsive device be capable of providing an output signal in digital form which may be used directly with digital indicator or control systems.

It is also desirable that the digital output signal produced by the pickoff system be of the pulse duration modulated type wherein the informational content of the signal is expressed as the time duration or "width" of the pulses making up the signal rather than the amplitude of the pulses. Signals of this type, which are often referred to as "pulse width modulated signals," may be amplified by a variety of non-linear, bistable or switch type amplifiers. Switch type amplifiers, in particular, are desirable because of their low cost, high signal-to-noise ratio, and high gain per stage. Pulse duration modulated output signals offer the further advantage of being readily converted to analog signals should the field of application so require. This may be done by relatively simple circuit means, such as an R-C low pass filter, for example, which derives the average value of the series of pulses forming the pulse duration modulated signal. This dual nature of pulse duration modulated signals makes pickoff systems producing such signals especially desirable for use with spatial orientation responsive devices.

In addition to the requirement that suitable pickoff systems for spatial orientation responsive devices be capable of providing pulse duration modulated output signals, it is important that the pickoff system employed not exert any restraining force or "drag" on the relative movement between the stator and rotor members of the device, since such a restraining force would introduce errors in the operation of the device. Another requirement for a satisfactory pickoff system is that the pickoff system be capable of use with gyroscopes of the free-rotor, gas bearing type wherein the rotor member is supported by the stator member on a thin film of gas to provide virtually frictionless operation. Under these circumstances, it is believed apparent that the pickoff system should add as little weight as possible to the rotor member and must not disturb the aerodynamic properties of the spinning rotor. Finally, it may be noted that a suitable pickoff system for spatial orientation responsive devices used in aircraft and guided missile applications must meet the ever present requirements of high accuracy, mechanical ruggedness and reliability of operation which are dictated by the field of application.

SUMMARY OF THE INVENTION

It is an object of this invention to provide photodynamic pickoff means for spatial orientation responsive devices and the like wherein the pickoff means provides output signals of the pulse duration modulated type.

It is a further object of this invention to provide photodynamic pickoff means for spatial orientation responsive devices and the like wherein the pickoff means provides pulse duration modulated output signals representing two-axis positional information with the use of a simple, integrated photoelectric transducer means.

It is a still further object of this invention to provide photodynamic pickoff means which are especially adapted for use with spatial orientation responsive devices and the like of the type having a free-rotor member which is supported by the stator member of the device on gas bearing means.

It is another object of this invention to provide photodynamic pickoff means for spatial orientation responsive devices and the like wherein the pickoff means exhibits the high degree of accuracy, mechanical ruggedness and other characteristics required for use in aircraft and guided missile applications.

Briefly, the photodynamic pickoff means of the invention, as applied to a spatial orientation responsive device of the type wherein relative angular movement is permitted between the rotor spin axis and the stator reference axis in at least one plane in which the axes lie, comprises a light source mounted on one of the stator or rotor members and light beam transmitting means mounted on the rotor for rotation therewith. The light beam transmitting means functions to transmit a beam of light from the light source toward one end of the rotor spin axis with the beam spaced a distance from the spin axis, so that the spinning of the rotor causes the light beam to rotate about the spin axis and thereby trace a closed path. The line of movement of the center of the closed path will then represent the angular movement between the rotor spin axis and the stator reference axis in the aforementioned plane. Photoelectric transducer means having at least two independently operable portions are mounted on the stator member for actuation by the rotating light beam. The two portions of the transducer means are disposed on opposite sides of a dividing line which is arranged to be perpendicular to the line of movement of the center of the closed path traced by the light beam and which bisects the closed path when the rotor spin axis coincides with the stator reference axis, so that each of the transducer portions produces a series of output pulses having a repetition rate corresponding to the rotor spin speed. Since the pulse width of each series of output pulses depends upon the length of the path traced by the light beam on the transducer portion associated with that series, any deviation of the rotor spin axis from the stator reference axis will cause the pulse widths of the two series of pulses to become unequal and the magnitude and sense of the pulse width differential will respectively represent the magnitude and direction of the aforementioned deviation between the spin axis and the reference axis.

When the pickoff means of the invention is employed with spatial orientation responsive devices wherein relative angular movement between the rotor spin axis and the stator reference axis is permitted in first and second mutually perpendicular planes in which the reference axis lies, the photoelectric transducer means has four independently operable portions which are defined by the intersection of a pair of mutually perpendicular dividing lines and the transducer is so mounted on the stator member that the dividing lines quadrisect the closed path traced by the light beam when the rotor spin axis and stator reference axis are in alignment. By virtue of this arrangement, the four series of output pulses from the transducer means will have pulses of the same width when the rotor spin axis and the stator reference axis are aligned and will have unequal widths when an angular deviation occurs between the two axes. The relative magnitudes of the pulse widths of the four series of output pulses will then completely define the angular deviation between the spin axis and the reference axis in both of the first and second planes. The invention also contemplates the use of suitable circuit means for combining the four series of output pulses from the photoelectric transducer means to derive two pulse duration modulated output signals which represent the magnitude and direction of the angular displacement of the rotor spin axis from the stator reference axis in both of the two planes.

In applications wherein the pickoff means of the invention are employed with spatial orientation responsive devices of the type having a substantially spherical stator member disposed within a hollow housing and a rotor member having a hollow spherical hub portion which is concentrically disposed about the stator member, the light source is preferably mounted on the stator member and is arranged to illuminate the interior of the hollow hub portion of the rotor. The light beam transmitting means may then take the form of an aperture formed in the rotor hub portion a distance from the rotor spin axis and the photoelectric transducer means is mounted on the interior of the housing with the stator reference axis passing through the point of intersection of the mutually perpendicular dividing lines of the transducer means. When the four portions of the transducer means are coplanar, light conducting means, such as a bundle of coated optic fibers, for example, are employed between the light beam transmitting means and the transducer means to cause the closed path traced by the light beam on the transducer portions to be circular when the rotor spin axis is angularly displaced from the stator reference axis, to thereby provide a linear output from the pickoff means.

The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
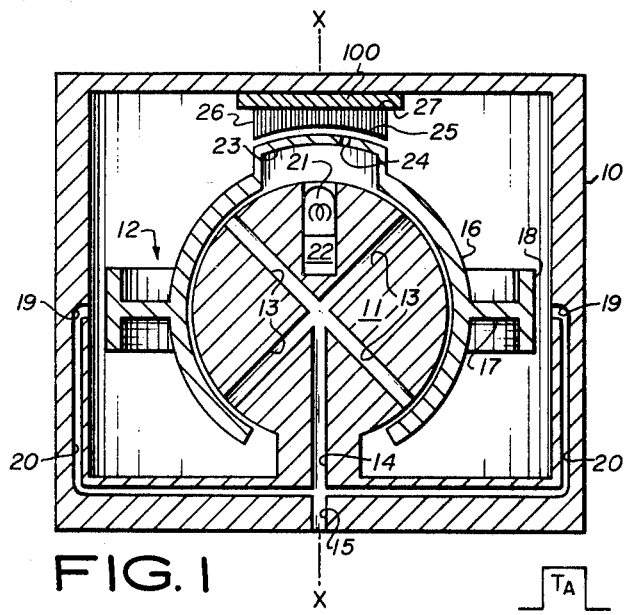
FIG. 1 is a full sectional view of a two-axis, free-rotor gyroscope of the hydrostatic gas bearing type utilizing the photodynamic pickoff means of the invention.

Referring now to FIG. 1 of the drawings, there is shown a two-axis free-rotor gyroscope having a hydrostatic gas bearing and employing the pickoff means of the invention. The gyroscope illustrated in FIG. 1 is a two-axis, directional gyroscope of the type disclosed in U.S. Patent No. 3,416,378 by John L. Evans, Hugh E. Riordan and Harold J. Straut for "Free-Rotor Gyro," to which reference is made for details of construction and operation. As seen in FIG. 1, the gyroscope comprises a substantially cylindrical housing 10 within which is disposed a spherical stator 11 and a rotor 12. The spherical stator 11 may be integral with the housing and is provided with a reference axis X—X which bisects the stator. The stator is also provided with a plurality of radially-disposed passageways 13 which are in communication with a central passageway 14 and an inlet passage 15 formed in the gyro housing. The inlet passage 15 is connected to a gas pressure supply source (not shown), such as a pressurized tank or "bottle," for example, for the purpose of providing a hydrostatic gas bearing between the spherical stator 11 and the rotor 12. Since as mentioned the spherical stator 11 may be integral with the housing 10 which parts are fixed relative to spinning rotor 12, the term "stator" as used herein in the appended claims may be broadly construed to read on any portion of the housing 10. The rotor 12 of the gyroscope has the general shape of a wheel and has a hollow spherical hub portion 16 which is concentrically disposed about the spherical stator 11. A radially-extending rim portion 17 of the rotor is provided with a plurality of turbine-bucket grooves (not shown) which are equidistantly spaced about the outer peripheral surface 18 of the rim. The turbine-bucket grooves cooperate with a plurality of gas inlet ports 19 which are equidistantly spaced about the cylindrical wall of the housing 10 of the gyroscope to provide means for bringing the rotor 12 up to operating speed. The gas inlet ports 19 are connected by passageways 20 formed in the housing 10 to the central inlet passage 15, so that a single gas supply source may be utilized to pressurize the gas bearing arrangement and the rotor spin-up means. A caging mechanism (not shown), such as the pneumatic type disclosed in the aforementioned U.S. Patent No. 3,416,378 of John L. Evans et al., for example, may be employed to "cage" the rotor 12 of the gyroscope prior to the time that it is brought up to full operating speed.

In operation, the gyro caging mechanism is activated to hold the spin axis of the rotor 12 in alignment with the stator reference axis X—X, as shown in FIG. 1 of the drawings, while the jets of gas from the inlet ports 19 cooperate with the turbine-bucket grooves on the peripheral surface 18 of the rotor to bring the rotor up to full operating speed. The single gas pressure supply source which may be employed to pressurizes the caging and rotor spin-up mechanisms also pressurizes the central passageway 14 and radially extending passages 13 in the stator 11, so that the spherical hub portion 16 of the rotor is kept equidistantly spaced from the spherical stator 11 by a thin film of gas which functions as a virtually frictionless bearing between the rotor and stator. When the rotor is brought up to full operating speed, the caging mechanism and rotor spin-up means are disconnected, so that the rotor is unrestrained against precessional movement. When the gyroscope housing 10 is fixedly mounted in a vehicle, such as an aircraft or guided missile, for example, the movements of the vehicle about two of its axes, such as the yaw and pitch axes, for example, will cause the rotor spin axis to angularly deviate from the stator reference axis X—X in two, mutually-perpendicular planes in which the stator reference axis X—X lies. The angular deviation between the rotor spin axis and the stator reference axis in one plane will be proportional to the attitude of the vehicle about its pitch axis while the angular deviation between the rotor spin axis and the stator reference axis in the other plane will be proportional to the yaw of the vehicle, so that the directional gyroscope illustrated is capable of providing two-axis positional information.

In order to sense the angular deviations between the rotor spin axis and the stator reference axis X—X in the two, mutually-perpendicular planes, a photodynamic pickoff system is provided for the gyroscope. As shown in FIG. 1 of the drawings, the pickoff system comprises a light source 21 which is disposed in a substantially cylindrical opening 22 formed in the stator 11 along the X—X axis. The light source 21 is preferably a solid-state light emitter which provides a source of light in the infra-red range of the spectrum and may conveniently comprise, for example, a gallium arsenide infra-red emitting diode. It will be understood, however, that the pickoff means of the invention will also operate with a light source which provides light in the visible range of the spectrum. The electric power for the light source 21 may be obtained from any convenient source (not shown), such as a battery, for example. Since the light source 21 provides the means for operating the pickoff system of the invention, it is desirable that the light source 21 not be energized until the rotor 12 is brought up to full operating speed and the rotor is uncaged, to thereby prevent the generation of spurious output signals by the pickoff. This may be accomplished by any convenient means, such as a pressure responsive switch, for example, which is responsive to the pneumatic pressure used to operate the gyro caging and spin-up mechanisms. The light emitted by the solid-state light emitting diode 21 serves to illuminate the interior of a hollow cylindrical "crown" 23, which is formed on the rotor hub portion 16 and is symmetrically disposed about the rotor spin axis. The outer surface of the crown 23 is spherical convex in shape and is concentrically disposed with respect to the spherical hub portion 16 of the rotor. The crown 23 is provided with a small aperture 24 which serves to transmit a small beam of light from the source 21 through the rotor. The aperature 24 is formed in the outer surface of the hollow crown 23 a small distance from the center of the crown, so that as the rotor spins, the aperture 24 follows a circular path about the rotor spin axis and the beam of light transmitted by the aperture follows a similar circular path.

The light passing through the aperture 24 in the crown 23 of the rotor is arranged to strike a spherical concave end 25 of a "bundle" 26 of coated optic fibers which has its other end 27 butted against a photoelectric transducer 100 which is mounted on the interior of the gyroscope housing 10. The bundle 26 of coated optic fibers, which may, for example, comprise a bundle of glass fibers having a reflecting coating applied to each fiber, functions as light conducting means in that each fiber in the bundle acts as an independent light wave guide by transmitting light internally along the inside of the fiber by internal reflection. The spherical concave end 25 of the bundle of optic fibers is so shaped that the center of curvature thereof is coincident with the center of the spherical stator member 11, so that as the rotor spin axis deviates from the stator reference axis, the gap between the outer surface of the crown 23 and the end 25 of the bundle 26 will remain constant at all times. Accordingly, when the beam of light transmitted through the aperture 24 strikes the spherical concave surface 25 of the bundle of optic fibers, the light rays will be transmitted through the appropriate fibers of the bundle to the end 27 of the bundle which abuts the face of the photoelectric transducer 100. If the fibers at the end 27 of the bundle of optic fibers are arranged to be perpendicular to the face of the transducer 100, it will be seen that the circular path traced by the beam of light from the aperture 24 will be transmitted without distortion to the face of the transducer 100. By this means, any disortion of the circular path traced by the beam of light which may be caused by the deviation of the rotor spin axis from the stator reference axis is effectively eliminated and the output from the pickoff means is made linear. If desired, the same effect could be achieved by eliminating the bundle 26 and utilizing a photoelectric transducer having a spherical concave face.

Figure 2:
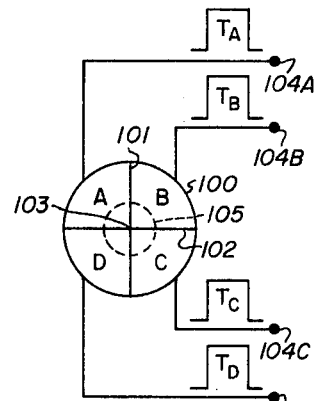
FIG. 2 is a plan view of a four-section photoelectric transducer used in the pickoff system of the invention showing the closed path traced by the beam of light when the stator reference axis is aligned with the rotor spin axis.

As seen in FIG. 2 of the drawings, the face of the photoelectric transducer 100 is substantially circular and is divided into four coplanar portions or sections 100A, 100B, 100C and 100D by a pair of mutually perpendicular dividing lines 101 and 102. The transducer 100 may conveniently comprise a silicon photodetector, for example, which functions essentially as a light responsive resistance wherein the electrical resistance presented by the detector varies as a function of the intensity of the light striking the surface of the detector. In a four section photodetector of this type, a single source of voltage is utilized to energize the detector, but each of the four sections of the detector is provided with a separate output, so that each section of the detector functions independently of the remaining sections. The photodetector 100 is mounted on the interior of the housing 10 of the gyroscope in such a manner that the stator reference axis X—X passes through the intersection 103 of the two mutually-perpendicular dividing lines 101 and 102 of the photodetector and is perpendicular to the plane of the detector. Additionally, the lines 101 and 102 of the photodetector are arranged to lie within the two mutually-perpendicular planes which may be said to define the two degrees of freedom of the gyroscope rotor with respect to the gyroscope stator. For example, the dividing line 101 on the face of the photodetector 100 may be caused to lie in the plane in which the angular deviations of the rotor spin axis and the stator reference axis caused by pitch axis movements occur, while the dividing line 102 of the photodetector may be caused to lie in the plane of angular deviations between the rotor spin axis and stator reference axis which are caused by yaw axis movements. Under these conditions, and when the vehicle in which the gyroscope is mounted is not subject to any yaw or pitch deviations, the spin axis of the rotor 12 is in alignment with the reference axis X—X of the stator 11 and the center of the circular path 105 traced by the beam of light passing through the aperture 24 is coincident with the point of intersection 103 of the dividing lines 101 and 102. Accordingly, the circular path 105 defined by the rotation of the beam of light will be divided into four equal lengths and the photodetector 100 will sequentially produce four output pulses having the same amplitude and the same pulse width as shown in FIG. 2 of the drawings. Assuming that a common supply terminal 104E (not shown in this view) of the photodetector is connected to a positive source of D.C. voltage, the four output pulses will be produced at output terminals 104A, 104B, 104C and 104D of the photodetector as illustrated. Since the gyroscope rotor is continually spinning, each of the four sections of the photodetector will produce a series of output pulses having a pulse repetition rate corresponding to the rotor spin speed. The amplitude of these pulses will be constant if the intensity of the light beam is constant. Since the width or time duration of the output pulses produced by each of the four sections of the photodetector 100 is determined by the length of the path traversed by the light beam in that section, when the path is quadrisected by the dividing lines 101 and 102, so that the light path is divided into four equal lengths, the pulse widths of the four output pulses will be of equal magnitude, as illustrated.

Figure 3:
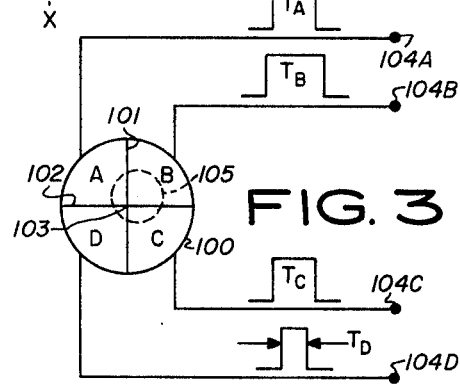
FIG. 3 is a plan view of the four-section photoelectric transducer of FIG. 2 showing the path traced by the beam of light when the stator reference axis is not in alignment with the rotor spin axis.

In order to illustrate the operation of the photodynamic pickoff system of the invention, it will be assumed that the vehicle in which the gyroscope is mounted is subject to both yaw and pitch axis deviations which will cause the spin axis of the rotor 12 to move angularly with respect to the stator reference axis X—X, the movement being such that the rotor spin axis will intersect the surface of the photodetector 100 somewhere in section 100B. Under these circumstances, the path 105 traced by the light beam passing through aperture 24 in the crown 23 of the rotor will again be circular because of the correcting action of the bundle of optic fibers 26, but as shown in FIG. 3 of the drawings, the center of the circular path will lie within section 100B of the photodetector instead of being coincident with the point of intersection 103 of the dividing lines 101 and 102. Since the circular path 105 traced by the light beam is no longer divided into four equal segments, the four sequentially occurring output pulses appearing at the terminals 104A through 104D of the photodetector will no longer be of equal time duration, but will however, remain at the same amplitude. Under the assumed conditions, the output pulses from section 100B of the photodetector will have a width $T_B$ which is greater than the widths of the pulses from the remaining sections, since the largest portion of the circular path 105 lies in section 100B of the photodetector. Similarly, in the example illustrated in FIG. 3 of the drawings, the widths $T_A$ and $T_C$ of the respective pulses from sections 100A and 100C of the photodetector will be substantially equal, but will be smaller than the pulse width $T_B$ of the pulse from section 100B. Since the portion of the circular path 105 which is located in section 100D of the photodetector has the shortest length, the pulse width $T_D$ of the pulses from that section will be the smallest of all the pulses generated by the photodetector. It will be understood that each of the four sections of the photodetector 100 produces a series of the output pulses illustrated for that section and that the pulse repetition rate of the pulses in the series will correspond to the rotor spin speed.

As thus far described, it is believed apparent that the four series of output pulses of equal amplitude, but variable width, produced by the photodetector 100 will serve to completely define the deviation of the rotor spin axis from the stator reference axis X—X in both of the perpendicular planes which represent the two degrees of freedom of the gyroscope. It may be demonstrated mathematically that the modulation function M of the pickoff system of the invention is given by the expression (1) $$M = -\frac{2}{\pi} \arc \sin\left[\frac{R}{r} \sin \phi\right]$$

where R is the distance from the center of rotation of the rotor member to the light spot formed by the beam of light on the surface of the photodetector, $r$ is the radius of the circular light path 105, and $\phi$ is the gyro input angle. Assuming that the gyroscope and the photodetector 100 are so oriented that movements of the vehicle in which the gyroscope is mounted about the pitch axis of the vehicle will cause the spin axis of the rotor 12 to be angularly displaced from the stator reference axis X—X in the plane in which the dividing line 101 of the photodetector lies, it is believed apparent that the differential between the sum of the pulse widths of the pulses from sections 100A and 100B of the photodetector and the sum of the pulse widths of the pulses from sections 100C and 100D of the photodetector will be proportional to the pitch axis deviation of the vehicle and will indicate the displacement of the center of the circular path 105 traced by the light beam with respect to the dividing line 102. For example, when the angular displacement of the rotor spin axis from the stator reference axis X—X causes the center of the circular path 105 to move above the line 102 on the face of the photodetector, the sum of the pulse widths $T_A$ and $T_B$ will be greater than the sum of the pulse widths $T_C$ and $T_D$, since the greater portion of the circular path 105 lies above the line 102. Similarly, when the center of the circular path 105 moves below the line 102, the sum of the pulse widths $T_C$ and $T_D$ will become greater than the sum of the pulse widths $T_A$ and $T_B$, so that the magnitude and sense of the pulse width differential between the two sets of pulses respectively represent the magnitude and direction of the pitch axis deviations.

In a similar manner, the magnitude and sense of the pulse width differential between the sum of the pulse widths of the pulses from sections 100A and 100D of the photodetector and the sum of the pulse widths of the pulses from sections 100B and 100C will represent the magnitude and direction of the deviation of the vehicle about the yaw axis. Accordingly, it is apparent that the relative magnitudes of the four series of pulses produced by the photodetector 100 will completely define any combination of yaw and pitch displacements of the vehicle in which the gyroscope is mounted.

Figure 4:
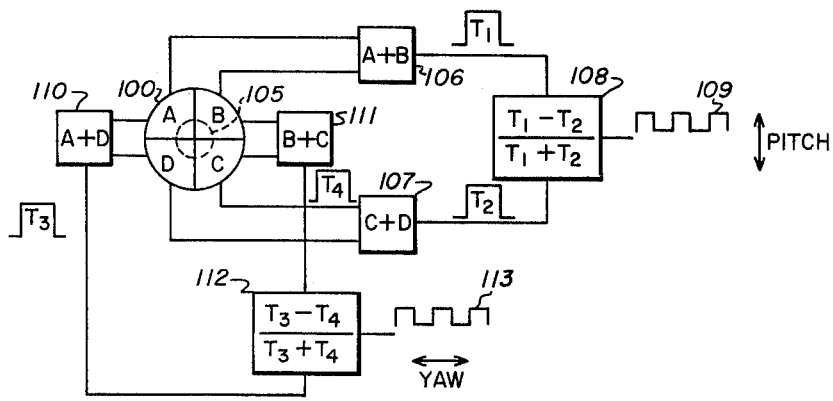
FIG. 4 is a schematic diagram showing the method of combining the four series of output pulses from the photoelectric transducer used in the pickoff system of the invention to obtain two pulse duration modulated output signals providing two-axis positional information.
Figure 5:
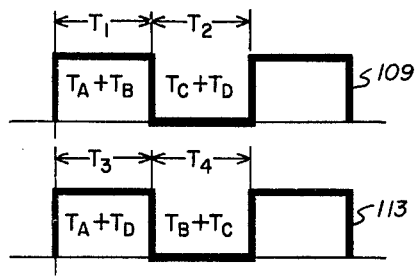
FIG. 5 is a set of representative waveshapes of the pulse duration modulated output signals derived from the pickoff system of the invention.

The method of combining the four series of output pulses from the photodetector 100 is schematically illustrated in FIG. 4 of the drawings wherein the output pulses from sections 100A and 100B of the photodetector 100 are shown as being applied to a summing circuit 106 which functions to provide an output pulse having a width $T_1$ which is equal to the sum of the pulse widths $T_A$ and $T_B$. Similarly, the output pulses from sections 100C and 100D of the photodetector are applied to a summing circuit 107 which functions to produce an output pulse having a width of $T_2$ which is equal to the sum of the pulse widths $T_C$ and $T_D$. The output pulses from summing circuits 106 and 107 are applied to a modulation circuit 108 which functions to produce a single series of output pulses 109 which is a pulse duration modulated signal representing the pitch axis deviation sensed by the gyro. The waveshape of the output signal 109 from the modulation circuit 108 is shown in detail in FIG. 5 of the drawings, wherein it is seen that the signal 109 comprises a series of pulses having a width $T_1$ which are separated by time periods $T_2$. Since $T_1$ is the sum of the pulse widths $T_A$ and $T_B$ and $T_2$ is the sum of the pulse widths $T_C$ and $T_D$, it is seen that the wave shape 109 completely defines both the magnitude and sense of the pulse width differential between the two sets of summed pulses and consequently represents both the magnitude and direction of the pitch axis deviation sense by the gyroscope. The modulation fraction $M_P$ for the pitch axis is given by the expression (2) $$M_P = \frac{T_1 - T_2}{T_1 + T_2}$$

Referring again to FIG. 4 of the drawings, the output pulses from sections 100A and 100D of the photodetector are applied to a summing circuit 110 which functions to provide an output pulse having a width $T_3$ which is equal to the sum of the pulse widths $T_A$ and $T_D$. The output pulses from sections 100B and 100C of the photodetector are applied to a summing circuit 111 which functions to produce an output pulse having a width $T_4$ which is equal to the sum of the pulse widths $T_B$ and $T_C$. The output pulses from summing circuits 110 and 111 which represent the yaw axis deviation sensed by the gyroscope are applied to a modulation circuit 112 which functions to produce a series of output pulses 113 which is a pulse duration modulated signal representing the yaw axis deviations. The waveshape of the pulse duration modulated output signal 113 from the modulation circuit 112 is shown in detail in FIG. 5 of the drawings, wherein it is seen that the signal comprises a series of pulses having a width $T_3$ which is equal to the sum of the pulse widths $T_A$ and $T_D$. The time interval $T_4$ between the pulses is equal to the sum of the pulse widths $T_B$ and $T_C$. Accordingly, the ratio of pulse time on $T_1$ to pulse time off $T_2$ serves to completely define the magnitude and direction of yaw axis deviations sensed by the gyroscope. The modulation fraction $M_Y$ for the yaw axis is given by the expression (3) $$M_Y = \frac{T_3 - T_4}{T_3 + T_4}$$

Figure 6:
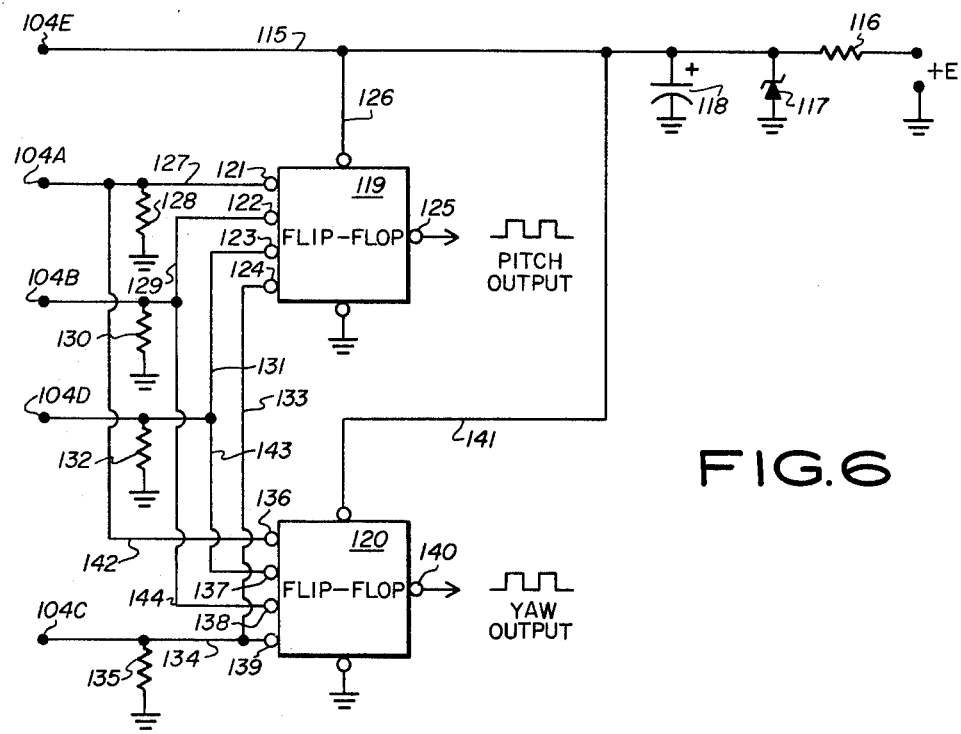
FIG. 6 is a circuit diagram of a suitable signal combining circuit which may be employed to derive the two pulse duration modulated output signals of the pickoff from the four outputs of the photoelectric transducer means.

The circuit diagram of a signal combining circuit capable of performing the aforementioned method of combining the output pulses from the photodetector 100 is shown in FIG. 6 of the drawings. As seen in FIG. 6, the common supply terminal 104E of the photodetector 100 is connected to a D.C. voltage supply source $+E$ by means of a lead 115 and an input resistance 116 to energize the photodetector. A shunt-connected Zener diode 117 and a shunt capacitor 118 are provided across the voltage output from the source $+E$ to regulate and filter the voltage supply. The functions performed by the summing circuits 106 and 107 and the modulation circuit 108 with respect to the pitch axis deviations in FIG. 4 of the drawings are performed by a single flip-flop circuit 119 in the arrangement of FIG. 6 of the drawings. In a similar manner, a second flip-flop circuit 120 in FIG. 6 performs the functions of the summing circuits 110 and 111 and the modulation circuit 112 with respect to the yaw axis deviations. The flip-flop circuits 119 and 120 may conveniently comprise a commercially-available flip-flop circuit having dual set inputs and dual reset inputs, such as Motorola type MC302 or MC352A, for example. Essentially, a flip-flop circuit of this type is a logic circuit having a bistable operating characteristic wherein the circuit may be triggered into one stable operating state by energization of either or both of the dual set inputs and triggered into the other stable operating state by energization of either or both of the dual reset inputs. When the set and reset inputs of the flip-flop circuit are successively, alternately activated, the output from the flip-flop circuit will be a series of square waves or pulses having a time duration which is determined by the cyclic triggering of the set and reset inputs. The amplitude of the output pulses from the flip-flop circuits will be constant and will be determined by the magnitude of the voltage supply and the parameters of the circuits.

Referring again to FIG. 6 of the drawings, the flip-flop circuit 119 is shown as comprising dual set inputs 121 and 122 which are parallel-connected and dual reset inputs 123 and 124 which are also parallel-connected, so that energization of either of the set inputs will trigger the flip-flop into one stable operating state and energization of either of the reset inputs will trigger the flip-flop into the other stable operating state. The flip-flop 119 is provided with an output 125 at which the pulse duration modulated signal representing the pitch output of the pickoff appears. Flip-flop 119 is connected to the D.C. supply voltage source $+E$ by means of a lead 126 and the lead 115. The set input 121 of the flip-flop is connected to the output terminal 104A of the photodetector 100 by means of a lead 127 and an input resistance 128, while the set input 122 of the flip-flop is connected to output terminal 104B of the photodetector by means of a lead 129 and an input resistance 130. The reset input 123 of the flip-flop is connected to the output terminal 104D of the photodetector by means of a lead 131 and an input resistance 132, while the reset input 124 is connected to the output terminal 104C of the photodetector by means of leads 133 and 134 and an input resistance 135. In a similar fashion, the flip-flop circuit 120 is provided with dual parallel-connected set inputs 136 and 137 and dual parallel-connected reset inputs 138 and 139. The output 140 of the flip-flop 120 provides a pulse duration modulated signal which represents the yaw axis deviations sensed by the gyroscope. The voltage supply for the flip-flop 120 is obtained from the D.C. voltage sulppy source $+E$ by means of a lead 141 and the lead 115, so that both flip-flops and the photodetector 100 are energized by a single D.C. supply voltage source. In practice, the D.C. supply voltage may be of the order of magnitude of $+28$ volts, for example. The set input 136 of flip-flop 120 is connected to the output terminal 104A of the photodetector by means of a lead 142, while the other set input 137 of the flip-flop is connected to the output terminal 104D of the photodetector by means of a lead 143 and the input resistance 132. The reset input 138 of the flip-flop is connected to the output terminal 104B of the photodetector by means of a lead 144 and the input resistance 130, while the other reset input 139 of the flip-flop is connected to the output terminal 104C of the photodetector by means of lead 134 and the input resistance 135.

By virtue of the foregoing arrangement, the set inputs 121 and 122 of the flip-flop 119 are connected to sections 104A and 104B of the photodetector, so that the flip-flop 119 will be triggered into its first stable operating state by the pulses from these sections and will remain in the first stable operating state during the time that the light beam traverses these sections. Accordingly, the dual parallel-connected set inputs function in the manner of a summing circuit to produce a pulse having a time duration $T_1$ which is equal to the sum of the pulse widths $T_A$ and $T_B$. Since the reset inputs 123 and 124 of flip-flop 119 are similarly connected to sections 100C and 100D of the photodetector, the flip-flop 119 will be triggered to its second stable operating state by the pulses from these sections and will remain in the second operating state for a time duration $T_2$ which is equal to the sum of the pulse widths $T_C$ and $T_D$. Accordingly, the output from flip-flop circuit 119 appearing at output terminal 125 will be a series of pulses having the wave shape 109 shown in FIG. 5 of the drawings and will be a pulse duration modulated signal representing the pitch axis deviations sensed by the gyroscope. In a similar manner, the set inputs 136 and 137 of flip-flop 120 are connected to sections 104A and 104D of the photodetector and function to cause the flip-flop 120 to generate an output pulse having a time duration $T_3$ which is equal to the sum of the pulse widths $T_A$ and $T_D$ of the pulses from these sections. The flip-flop circuit 120 will be triggered into its second stable operating state by the pulses applied to the reset inputs 138 and 139 which are respectively connected to the sections 100B and 100C of the photodetector, so that no pulse will be produced for a period of time $T_4$ which is equal to the sum of the pulse widths $T_B$ and $T_C$ of the output pulses from these sections. Accordingly, the output signal appearing at output terminal 140 of flip-flop 120 will be a series of pulses having the waveshape 113 shown in FIG. 5 of the drawings and will be a pulse duration modulated signal representing the yaw axis deviations sensed by the gyroscope.

From the foregoing analysis, it is believed apparent that the photodynamic pickoff system of the invention provides two-axis positional information in the form of pulse duration modulated signals which may be employed directly in instrumentation and control system of the digital type without the necessity of utilizing any analog-to-digital conversion equipment. For example, the pulse duration modulated pitch and yaw signals from the pickoff system of the invention could be utilized directly to control electromechanical gas valves for thrust control of a guided missile. Since the informational content of the pulse duration modulated signals is contained in the ratio of pulse time on to pulse time off, rather than the amplitudes of the pulses, the signals are true digital signals and will be substantially independent of rotor spin speed, so that the pickoff will continue to function with a high degree of accuracy even with "run down" gyros. If desired, the pulse duration modulated pitch and yaw output signals from the pickoff system of the invention may be averaged by means, such as an R-C low pass filter, for example, to derive analog signals which are proportional to the pitch and yaw deviations sensed by the gyroscope. Again, the analog signals will be virtually independent of rotor spin speed and will enable the pickoff to operate with a high degree of accuracy under conditions of slowly diminishing rotor spin speed. This dual nature of the pulse duration modulated signals from the pickoff system of the invention permits the pickoff system to have great flexibility of use in applications requiring either digtial or analog signals. When the pickoff system is employed with gyroscopes or other spatial orientation responsive devices providing only single axis positional information, the photodetector 100 need only comprise two sections and the necessity for pulse width summing means is dispensed with. Since the sensing operations performed by the pickoff system of the invention depend upon the movement of a beam of light, it is obvious that the pickoff system does not impose any undesirable load or drag on the movements of the rotor member of the gyroscope and does not impair the gyroscope accuracy of operation. Accordingly, the pickoff system may be used with free-rotor gyroscopes of the gas bearing type. Finally, it is apparent that the pickoff system of the invention utilizes a simple, integrated photoelectric transducer arrangement to provide two-axis positional information without any undesirable cross-coupling and possesses the high accuracy of operation and mechanical ruggedness which are necessary for aircraft and guided missile applications.

It is believed obvious that many changes could be made in the construction and described uses of the foregoing pickoff system and many seemingly different embodiments of the invention could be constructed without departing from the scope thereof. For example, the pickoff system of the invention is not limited to use in directional gyroscopes of the type illustrated, but may also be applied to other types of gyroscopes such as the hydrostatic gas bearing gyroscope disclosed in U.S. Patent No. 3,187,588, granted to Bernard Parker on June 8, 1965. Since the gyroscope disclosed in the aforementioned Parker patent comprises a substantially spherical rotor member which is disposed in a hollow, substantially spherical stator member, the light source for the pickoff could be mounted on the rotor member along the spin axis thereof. Furthermore, the pickoff system of the invention may be utilized with other types of spatial orientation responsive devices, such as rate gyros, angular accelerometers and inertial platforms, for example. In a similar manner, the particular circuitry disclosed for deriving the two pulse duration modulated output signals from the four series of output pulses from the photodetector 100 could be replaced by other and different circuits to accomplish the same result. Accordingly, it is intended that all matter contained in the above description or shown in the accompanying drawings shall be interpreted as illustrative and not in a limiting sense.

What is claimed is:

1. Photodynamic pickoff means for spatial orientation responsive devices and the like of the type having a stator member, a spinning rotor member, and bearing means interposed between said members for supporting the spinning rotor member to permit relative angular movement between the spin axis of the rotor member and a reference axis of the stator member in at least one plane in which said axes lie, comprising a light source mounted on one of said members; means mounted on said rotor member for rotation therewith and being spaced from said spin axis for transmitting a beam of light from said source toward one end of the rotor spin axis, said beam thereby being spaced a distance from the rotor spin axis so that rotation of the rotor member causes the light beam to rotate and thereby trace a closed path at each point along the length thereof with the line of movement of the center of the closed path representing the angular deviation between the rotor spin axis and the stator reference axis in said plane; and photoelectric transducer means symmetrically mounted on said stator member about said reference axis for actuation by the rotating light beam, said transducer being responsive to said line of movement for providing an output signal representing the angular deviation between the rotor spin axis and the stator reference axis in said plane.

2. Photodynamic pickoff means as claimed in claim 1, wherein said light source is an infra-red emitter and said photoelectric transducer means is selected to have a peak output in the infra-red range.

3. Photodynamic pickoff means as claimed in claim 1, wherein said photoelectric transducer means includes at least two independently operable portions, said two portions being disposed on opposite sides of a dividing line which is perpendicular to the line of movement of the center of said closed path and which bisects the closed path when the rotor spin axis coincides with the stator reference axis, so that each of said respective transducer portions produces a series of output pulses having a repetition rate corresponding to the rotor spin speed and a pulse width representing said angular deviation between the rotor spin axis and the stator reference axis in said plane.

4. Photodynamic pickoff means as claimed in claim 1, wherein the two portions of said photoelectric transducer means are coplanar and light conducting means are provided to cause the closed path traced by the light beam on said portions to be circular when the rotor spin axis is angularly displaced from the stator reference axis in said plane, to thereby provide a linear output for the pickoff means.

5. Photodynamic pickoff means as claimed in claim 1, wherein relative angular movement between the rotor spin axis and the stator reference axis is permitted in a second plane perpendicular to said first-named plane, the line of intersection of said planes being coincident with the stator reference axis, and said photoelectric transducer means has four independently operable portions defined by the intersection of said first-named dividing line with a second dividing line perpendicular thereto, the said first and second dividing lines being arranged to quadrisect the closed path traced by the light beam when the rotor spin axis coincides with the stator reference axis, so that each of the four transducer portions produces a series of output pulses having a repetition rate corresponding to the rotor spin speed and a pulse width representing the angular deviation between the rotor spin axis and the stator reference axis in both of said planes, whereby the relative magnitudes of the pulse widths of the four series of output pulses completely define the angular deviation between the rotor spin axis and the stator reference axis in both of said planes.

6. Photodynamic pickoff means as claimed in claim 5, wherein said photoelectric transducer means is mounted on said stator member with the first dividing line thereof disposed in said second plane and the second dividing line thereof disposed in said first plane, so that the stator reference axis passes through the point of intersection of said dividing lines and is perpendicular to each of said dividing lines, whereby the magnitude and sense of the differential between the combined pulse width of the output pulses from the transducer portions disposed on one side of said first dividing line and the combined pulse width of the output pulses from the transducer portions disposed on the other side of said first dividing line respectively represent the magnitude and direction of the angular deviation between the rotor spin axis and the stator reference axis in said first plane and the magnitude and sense of the differential between the combined pulse width of the output pulses from the transducer portions disposed on one side of said second dividing line and the combined pulse width of the output pulses from the transducer portions disposed on the other side of said second dividing line respectively represent the magnitude and direction of the angular deviation between the rotor spin axis and the stator reference axis in said second plane.

7. Photodynamic pickoff means as claimed in claim 6, wherein the four portions of said photoelectric transducer means are coplanar and light conducting means are provided to cause the closed path traced by the light beam on said transducer portions to be circular when the rotor spin axis is angularly displaced from the stator reference axis in both of said planes, said light conducting means comprising a bundle of coated optic fibers perpendicularly disposed with respect to the plane of the transducer means and having a spherical concave end surface adapted to receive the rotating light beam from the rotor member, whereby a linear output is provided for the pickoff means.

8. Photodynamic pickoff means as claimed in claim 6, further comprising first circuit means for summing the pulse widths of the output pulses from the transducer portions disposed on said one side of the first dividing line, summing the pulse widths of the output pulses from the transducer portions disposed on said other side of the first dividing line, and producing a first pulse duration modulated output signal representing the magnitude and sense of the differential between the summed pulse widths from the transducer portions disposed on opposite sides of the first dividing line; and second circuit means for summing the pulse widths of the output pulses from the transducer portions disposed on said one side of the second dividing line, summing the pulse widths of the output pulses from the transducer portions disposed on said other side of the second dividing line, and producing a second pulse duration modulated output signal representing the magnitude and sense of the differential between the summed pulse widths from the transducer portions disposed on opposite sides of the second dividing line, whereby said first pulse duration modulated output signal represents the magnitude and direction of the angular deviation between the rotor spin axis and the stator reference axis in said first plane and said second pulse duration modulated output signal represents the magnitude and direction of the angular deviation between the rotor spin axis and the stator reference axis in said second plane.

9. Photodynamic pickoff means as claimed in claim 8, wherein each of said first and second circuit means comprises a flip-flop circuit having dual set and reset inputs respectively coupled to the transducer portions disposed on opposite sides of the dividing line associated with that circuit means.

10. Photodynamic pickoff means as claimed in claim 8, further comprising means for deriving the average value of each of said first and second pulse duration modulated output signals, to thereby provide corresponding output signals in analog form.

11. Photodynamic pickoff means for spatial orientation responsive devices and the like of the type having a substantially spherical stator member disposed within a hollow housing, a spinning rotor member having a hollow substantially spherical hub portion concentrically disposed about said stator member, and gas bearing means interposed between the stator member and the hub portion of the rotor member to permit relative angular movement between the spin axis of the rotor member and a reference axis of the stator member in first and second mutually perpendicular planes in which the reference axis lies, comprising a light source mounted on said stator member along the reference axis thereof for illuminating the interior of the rotor hub portion in the vicinity of the rotor spin axis; means comprising an aperture formed in the rotor hub portion in the vicinity of the rotor spin axis for transmitting a beam of light from said source toward one end of the stator reference axis, said aperture being spaced a distance from the rotor spin axis so that the spinning of the rotor member causes the light beam to rotate and thereby trace a circular path at each point along the length of the spin axis; photoelectric transducer means having four independently operable coplanar portions mounted on the interior of the housing at said one end of the stator reference axis for actuation by the rotating light beam, the first and second transducer portions being disposed on one side of said first plane, the third and fourth transducer portions being disposed on the other side of said first plane, the first and fourth transducer portions being disposed on one side of said second plane and the second and third transducer portions being disposed on the other side of said second plane, so that each of said transducer portions produces a series of output pulses having a pulse repetition rate corresponding to the rotor spin speed and a pulse width corresponding to the length of the path traced by the light beam in that portion; and a bundle of parallel light conducting optic fibers disposed along the stator reference axis, said bundle having one end thereof abutting said photoelectric transducer means and the other end thereof arranged to receive the rotating light beam, the said other end of the bundle being spherical concave in shape with the center of curvature thereof coincident with the center of the spherical stator member, so that the closed path tracted by the light beam on said transducer means is circular when the rotor spin axis is not coincident with the stator reference axis, whereby the relative magnitudes of the pulse widths of the four series of output pulses from the transducer means completely define the angular deviation between the rotor spin axis and the stator reference axis in both of said first and second planes.

12. Photodynamic pickoff means as claimed in claim 11, further comprising first and second flip-flop circuits each having dual set and reset inputs and an output; means for coupling the set inputs of said first flip-flop circuit to the outputs of said first and second transducer portions and the reset inputs thereof to the outputs of said third and fourth transducer portions, so that a pulse duration modulated signal appears at the output of said first flip-flop circuit which represents the magnitude and direction of the angular deviation between the rotor spin axis and the stator reference axis in said second plane; and means for coupling the set inputs of said second flip-flop circuit to the outputs of said first and fourth transducer portions and the reset inputs thereof to the outputs of said second and third transducer portions, so that a pulse duration modulated signal appears at the output of said second flip-flop circuit which represents the magnitude and direction of the angular deviation between the rotor spin axis and the stator reference axis in said first plane.

References Cited

UNITED STATES PATENTS

| | | | |
|---|---|---|---|
| 3,277,304 | 10/1966 | Vyce | 74—5.6 XR |
| 3,323,377 | 6/1967 | Fraiser et al. | 74—5.6 |
| 3,328,595 | 6/1967 | Todd | 74—5.6 XR |
| 3,379,889 | 4/1968 | Barnett et al. | 74—5 XR |

FRED C. MATTERN, JR., Primary Examiner

M. ANTONAKAS, Assistant Examiner